US012637119B2

(12) United States Patent
Darvell et al.

(10) Patent No.: US 12,637,119 B2
(45) Date of Patent: May 26, 2026

(54) FRONT COVER FOR A RAIL VEHICLE COUPLER

(71) Applicant: DELLNER COUPLERS AB, Falun (SE)

(72) Inventors: Magnus Darvell, Falun (SE); Oskar Edgar, Falun (SE); Rasmus Sjöberg, Borlänge (SE); Peter Hildingsson, Falund (SE)

(73) Assignee: DELLNER COUPLERS AB, Falun (SE)

( * ) Notice: Subject to any disclaimer, the term of this patent is extended or adjusted under 35 U.S.C. 154(b) by 492 days.

(21) Appl. No.: 18/037,413

(22) PCT Filed: Nov. 18, 2021

(86) PCT No.: PCT/SE2021/051153
§ 371 (c)(1),
(2) Date: May 17, 2023

(87) PCT Pub. No.: WO2022/108510
PCT Pub. Date: May 27, 2022

(65) Prior Publication Data
US 2023/0415794 A1 Dec. 28, 2023

(30) Foreign Application Priority Data

Nov. 20, 2020 (SE) .................................... 2051360-2

(51) Int. Cl.
*B61G 11/16* (2006.01)
*B61G 3/16* (2006.01)
(Continued)

(52) U.S. Cl.
CPC ................ *B61G 11/16* (2013.01); *B61G 3/16* (2013.01); *B61G 5/10* (2013.01); *B61G 7/00* (2013.01);
(Continued)

(58) Field of Classification Search
CPC .......... B61G 11/16; B61G 11/18; B61G 5/10; B61G 7/00; B61G 7/14; B61G 3/16
(Continued)

(56) References Cited

U.S. PATENT DOCUMENTS 3,469,713 A * 9/1969 Edwards ................ A63H 19/18
213/75 TC
2015/0034582 A1* 2/2015 Vicente Corral ...... B61G 11/00
213/7

FOREIGN PATENT DOCUMENTS

BE 435179 A 12/1939
CN 1842458 A 10/2006
(Continued)

OTHER PUBLICATIONS

Chinese Office Action in Chinese Application No. 202180077122.9 dated Jun. 1, 2025.

*Primary Examiner* — S. Joseph Morano
*Assistant Examiner* — James William Jones
(74) *Attorney, Agent, or Firm* — Dilworth & Barrese, LLP.; Michael J. Musella, Esq.

(57) ABSTRACT

The present invention relates to a front cover for a coupler for a rail vehicle, the front cover (1) comprising a cover body (10) for covering a front end of the coupler, wherein the cover body (10) comprises at least one deformation zone (12), said deformation zone (12) having a cover portion (16) that is configured to break or deform when subjected to a collision force for providing access through the cover body (10) at the at least one deformation zone (12) during a collision. The invention also relates to a method for mounting a front cover on a coupler, and to a method for deforming a front cover.

20 Claims, 6 Drawing Sheets

Figure 1:
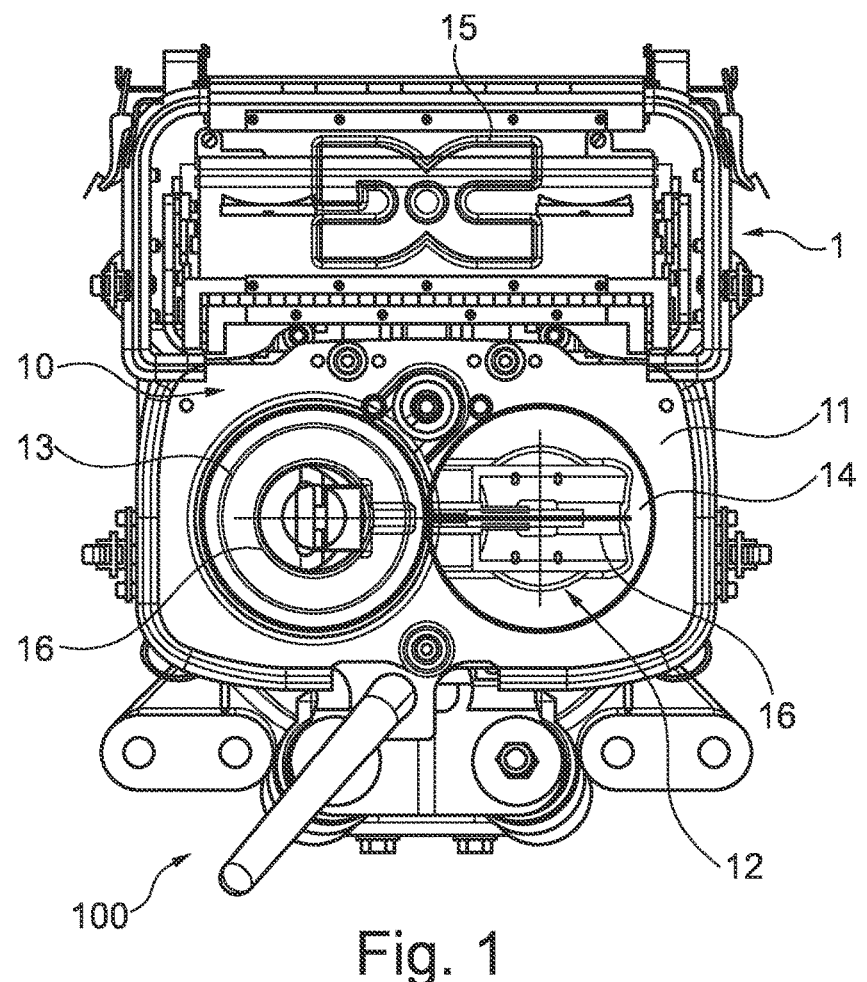

(51) Int. Cl.

| | |
|---|---|
| *B61G 5/10* | (2006.01) |
| *B61G 7/00* | (2006.01) |
| *B61G 7/14* | (2006.01) |
| *B61G 11/18* | (2006.01) |
| *B60D 1/60* | (2006.01) |

(52) U.S. Cl.
CPC ................ *B61G 7/14* (2013.01); *B61G 11/18* (2013.01); *B60D 1/60* (2013.01)

(58) Field of Classification Search
USPC .................................. 213/220, 221, 75 R, 71
See application file for complete search history.

(56) References Cited

FOREIGN PATENT DOCUMENTS

| | | | | | |
|---|---|---|---|---|---|
| CN | 201049637 | Y | * | 4/2008 | |
| CN | 201283874 | Y | * | 8/2009 | |
| CN | 207045350 | U | | 2/2018 | |
| CN | 109328156 | A | | 2/2019 | |
| DE | 19636225 | A1 | * | 3/1998 | .............. B61F 19/04 |
| DE | 10015420 | A1 | | 10/2001 | |
| DE | 102012207526 | A1 | | 11/2013 | |
| DE | 102016210004 | A1 | | 12/2017 | |
| DE | 102016210642 | A1 | | 12/2017 | |
| DE | 102018111979 | A1 | | 11/2019 | |
| EP | 1663754 | A1 | | 6/2006 | |
| EP | 2308738 | A1 | * | 4/2011 | .............. B60D 1/60 |
| EP | 2308738 | B1 | | 7/2013 | |
| EP | 3231685 | A1 | | 10/2017 | |
| EP | 3492234 | A1 | | 6/2019 | |
| EP | 3492334 | A1 | * | 6/2019 | .............. B61G 7/00 |
| SE | 526056 | C2 | * | 6/2005 | .............. B61G 9/10 |
| SE | 1050678 | A1 | * | 12/2011 | .............. B61G 7/14 |
| WO | 2020/078711 | A1 | | 4/2020 | |

* cited by examiner

FRONT COVER FOR A RAIL VEHICLE COUPLER

TECHNICAL FIELD

The present invention relates to a front cover comprising a cover body for covering a front end of a coupler.

BACKGROUND

Within the field of couplers for railway vehicles, it is generally desirable to protect an end of the coupler when not in a coupled position. The purpose of this is to prevent intrusion of moisture and dirt during both operation and standstill of the rail vehicle, and also to protect the end of the coupler from objects accidentally present on railway tracks such as animals that may collide with the railway vehicle. By using a sturdy front cover, malfunction due to animal collision and similar is thus avoided.

However, railway couplers form an important part of the crash management system for railway vehicles, and in order to function as intended and absorb collision forces it is very important that such forces are guided along the coupler to allow energy absorption devices such as dampers and deformation tubes to be activated. When a collision occurs, there is a risk that bending forces cause the coupler to buckle, thereby preventing the energy absorption devices from operating as intended. The result is often significant damage to the railway vehicle and to any goods or passengers present inside.

There is therefore a need for improvements within the area of front covers for couplers, so that the front end may be protected but at the same time maintaining desired operation of the crash management system in the event of a collision.

SUMMARY

The object of the present invention is to eliminate or at least to minimize the problems discussed above. This is achieved by a front cover, a coupler having a front cover, a method for mounting a front cover, and a method for deforming a front cover according to the description herein.

The front cover according to the invention comprises a cover body for covering a front end of the coupler, wherein the cover body comprises at least one deformation zone. Said deformation zone has a cover portion that is configured to break or deform when subjected to a collision force for providing access through the cover body at the at least one deformation zone during a collision. Thereby, a collision with another rail vehicle will allow the couplers of the rail vehicles to couple or mate due to the deformation or breakage of the deformation zones so that the mechanical coupler becomes accessible. By enabling coupling or mating (where couplers are held with their front ends facing each other) to take place during the collision, it is ensured that collision forces propagate through the coupler so that they may be absorbed as intended. The front cover is thus able to serve the main purpose of protecting the end of the coupler while at the same time giving access to the coupler when subjected to the collision force.

Suitably, the cover body comprises a first cover body section for covering a mechanical coupler on the front end of the coupler and a second cover body section for covering an electrical coupler on the front end of the coupler, wherein the first cover body section comprises the at least one deformation zone. Thereby, the electrical coupler is protected by the second cover body section that does not comprise a deformation zone. This serves to protect the electrical coupler and to prevent access to it as long as the front cover remains in place.

Also, the second cover body section is suitably offset from the first cover body section in a first direction, said first direction being a direction that is horizontal when the front cover is mounted on a coupler. This further protects the electrical coupler since a collision force will in most cases hit the first cover body section on the mechanical coupler first. Since the mechanical coupler is stronger and less easily damaged, this means that the electrical coupler is further protected from damage by any collision force being first applied to the mechanical coupler through the first cover body section.

Suitably, the front cover comprises at least one holder for mounting the front cover on a coupler. Thereby, the front coupler is held in place in a convenient and reliable way. In some embodiments, said at least one holder comprises a breakable part that is configured to break when subjected to a collision force. Thereby, as soon as the holder breaks, the collision force is distributed through the front cover and onto the end of the coupler so that energy absorbing components of the coupler may act as intended.

Said collision force is suitably a force of at least 40 kN. This is a force that causes activation of at least one damper and it is advantageous that the collision force causes deformation or breakage of the cover portion so that a coupling connection of a damper is able to penetrate the front cover and enter an opening in the front end of the coupler on which the front cover is mounted. Thereby, the front end of the coupler and also the front end of a second, colliding coupler are held adjacent to each other so that buckling of the coupler is avoided. Alternatively, said collision force is suitably a force of at least 220 kN. This is a force that causes irreversible deformation to energy absorption devices in the coupler, and for any forces at this level or larger it is advantageous that the deformation of the deformation zones occurs so that access to the end of the coupler is provided to allow for front ends of the coupler and a colliding coupler being held adjacent to each other in situations where the coupler collides with a railway vehicle. This has the benefit that buckling of the coupler is avoided so that energy absorption may take place as desired.

In some embodiments, the at least one cover portion is made from an elastomer, preferably comprising rubber. This is beneficial in allowing for a deformation in the event of a collision force, and the elastomer may also provide breakage when it is stretched by an object that pushes against the deformation zones. When the coupler collides with a railway vehicle having a similar coupler, that object will be a protruding part of a mechanical coupler, i.e. a coupling connection, and by the object pushing into or through the deformation zone the object will penetrate the front cover and extend into an opening of the coupler on which the front cover is mounted. This in turn causes the front ends of the couplers to meet and contact each other via the front cover or optionally to be held at a distance from each other in situations where the coupling connection is not able to enter the opening fully. This prevents buckling at the front ends of the couplers so that the collision force may be absorbed by the energy absorption devices in the couplers.

In some embodiments, the at least one cover portion is made from a brittle material. Thereby, the cover portion is able to break into a plurality of pieces when subjected to the collision force and this allows access to the coupler on which the front cover is mounted. Suitably, the at least one cover portion comprises metal or reinforced polymer. If comprising metal, the cover portion is suitably formed as a sheet. A reinforced polymer is suitably fiberglass or carbon fiber reinforced polymer.

Suitably, a cover portion may protrude from the cover body to form a protruding portion for covering a protruding coupling connection of a coupler in a mounted state on a front end of a coupler. Thereby, a protective cover is achieved for a coupling connection that extends from the end of the coupler.

Also, the cover portion of the at least one deformation zone may be mounted on the cover body. Thereby, the cover body may be provided with an opening at the deformation zone and the opening may be covered by the cover portion and be attached to form the front cover.

In another embodiment, the cover portion of the at least one deformation zone is integrated with the cover body. Thereby, the deformation zone may be formed by the same material as the cover body, and the feature of deforming or breaking may be achieved by the cover portion being thinner than the cover body, or alternatively in any other suitable way.

The present invention also comprises a coupler for a rail vehicle, wherein the coupler comprises a mechanical coupler that has at least one coupling connection for forming a mechanical coupling with a similar coupler. The coupler further comprises a front cover according to the invention, wherein the front cover is mounted on a front end of the coupler such that a cover portion of a deformation zone of the front cover covers a coupling connection. Thereby, protection for the mechanical coupler and optionally also for an electrical coupler is achieved, while at the same time allowing access to the front end of the coupler through the cover body in the event of a collision force being applied to the front cover.

The present invention also comprises the method for mounting the front cover on a coupler of a rail vehicle. The inventive method comprises providing a front cover according to the invention and also providing a coupler that has at least one coupling connection for mechanically coupling the coupler to a similar coupler, wherein the coupling connection is arranged at a front end of the coupler. The invention also comprises applying the front cover to the front end of the coupler such that a deformation zone of the cover body of the front cover covers the coupling connection of the coupler.

Thereby, the front end of the coupler is protected by the cover body and the deformation zone is arranged so that access to the coupling connection is possible when a collision force is applied to the deformation zone. In this way, both main advantages of the invention are achieved by on the one hand protecting the coupler end and on the other hand allowing access to the coupling connection so that collision forces may be handled in the event of a crash.

The invention may suitably also comprise mounting a holder of the front cover on the coupler for fixating the front cover in relation to the coupler. Thereby, the front cover is held in place by the holder in a stable and convenient way.

Also, the front cover is suitably placed on the front end of the coupler such that a first cover body section covers the mechanical coupler with the coupling connection and a second cover body section covers an electrical coupler of the coupler. The first cover body section and the second cover body section are suitably formed as sheets or panels that are configured to be attached to each other and to extend across the front end of the coupler when mounted. Thereby, the mechanical coupler may be protected by the first cover body section that comprises the deformation zone whereas the second cover body section serves to protect the electrical coupler. By not providing a deformation zone in connection with the electrical coupler, damage to the electrical coupler is minimized.

The invention suitably also includes a method for deforming a front cover. This method comprises hitting a front cover mounted on a front end of a first coupler by a front end of a second coupler such that a collision force is applied in a first direction, and deforming or breaking a cover portion of at least one deformation zone on the front cover such that a coupling connection arranged in the front end of the second coupler enters an opening arranged in the front end of the first coupler. The coupling connection suitably protrudes from the coupler end and the opening is suitably provided in the coupler end for providing access to the coupler so that the protruding coupling connection may be received into said coupler end and a mechanical coupling between the couplers may occur or the coupling connection may be held at least partially in the opening in order for the front ends of the couplers to mate. The front cover provides the advantage of enabling the mechanical coupling to occur even though the front cover itself is not removed before the collision force is applied.

Many additional benefits and advantages of the present invention will be readily understood by the skilled person in view of the detailed description below.

DRAWINGS

Figure 2:
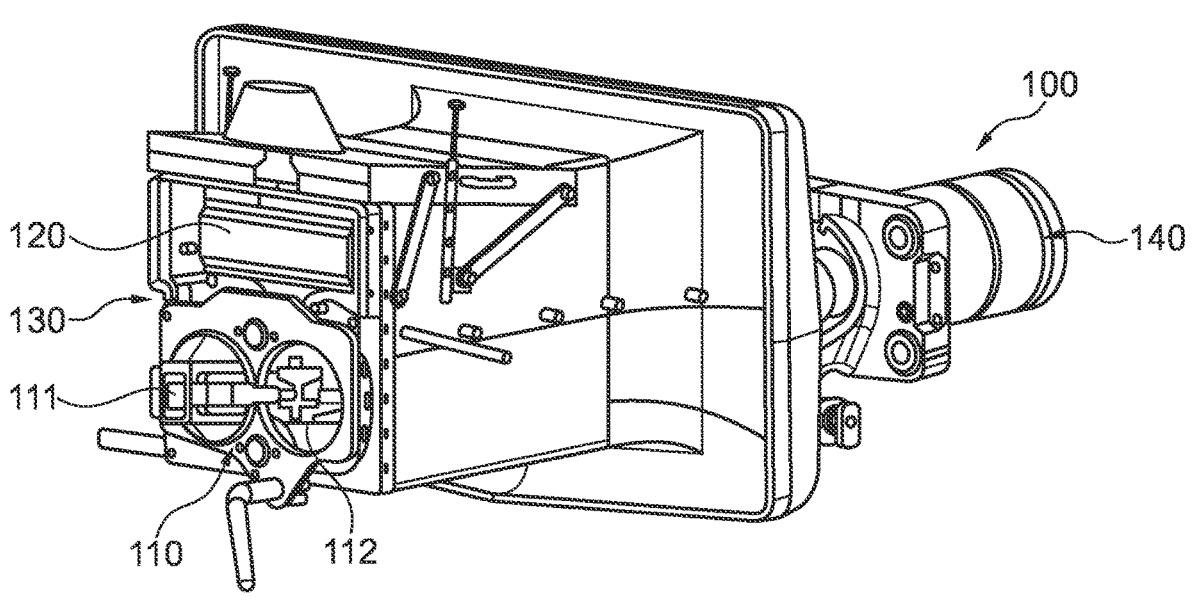
Figure 3A:
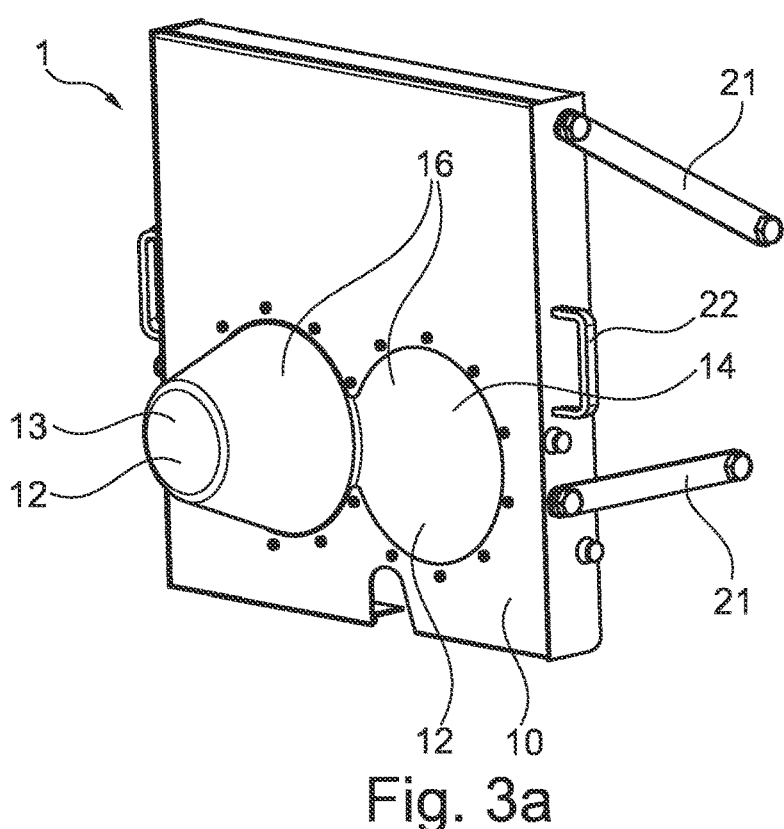
Figure 3B:
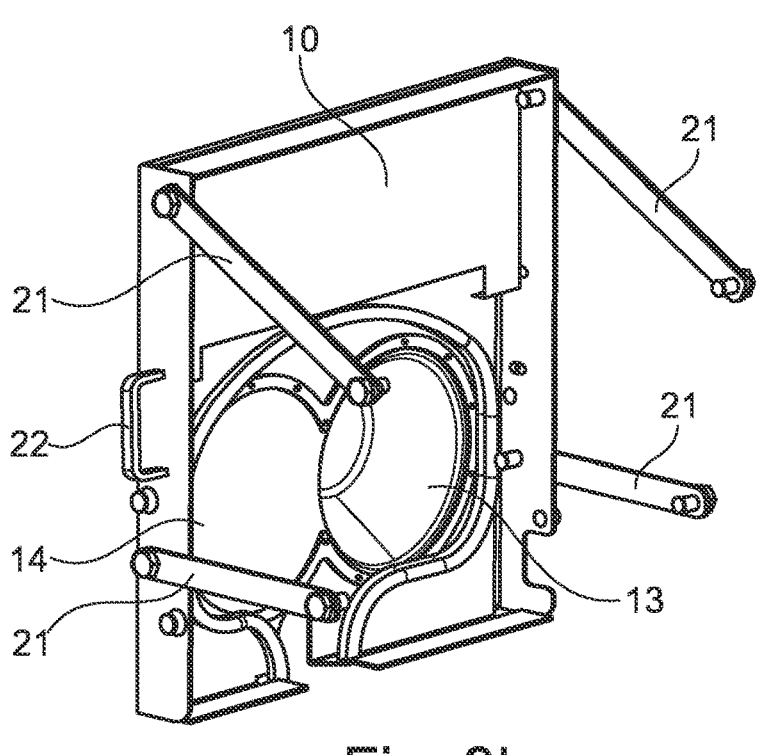
Figures 4A, 4B, 4C:
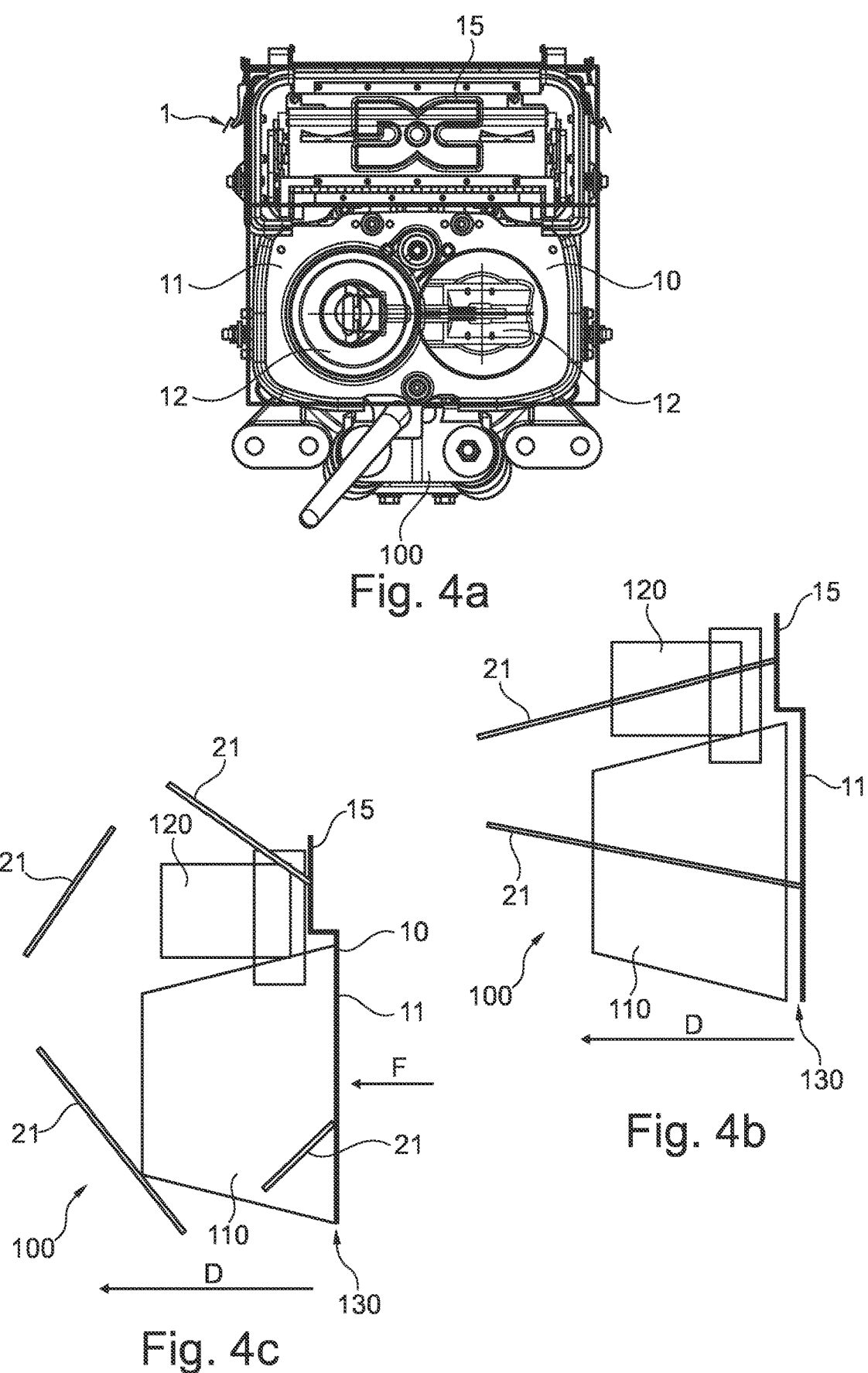
Figures 5A, 5B, 5C, 5D:
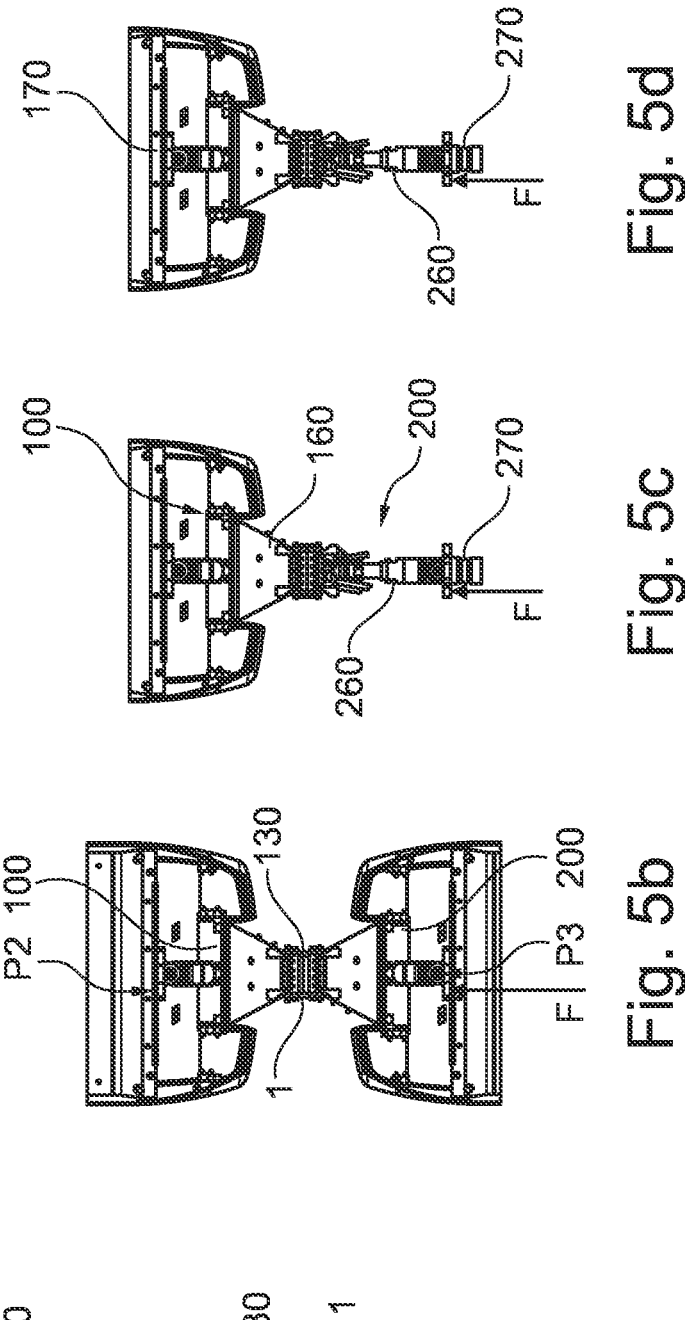
Figure 6A:
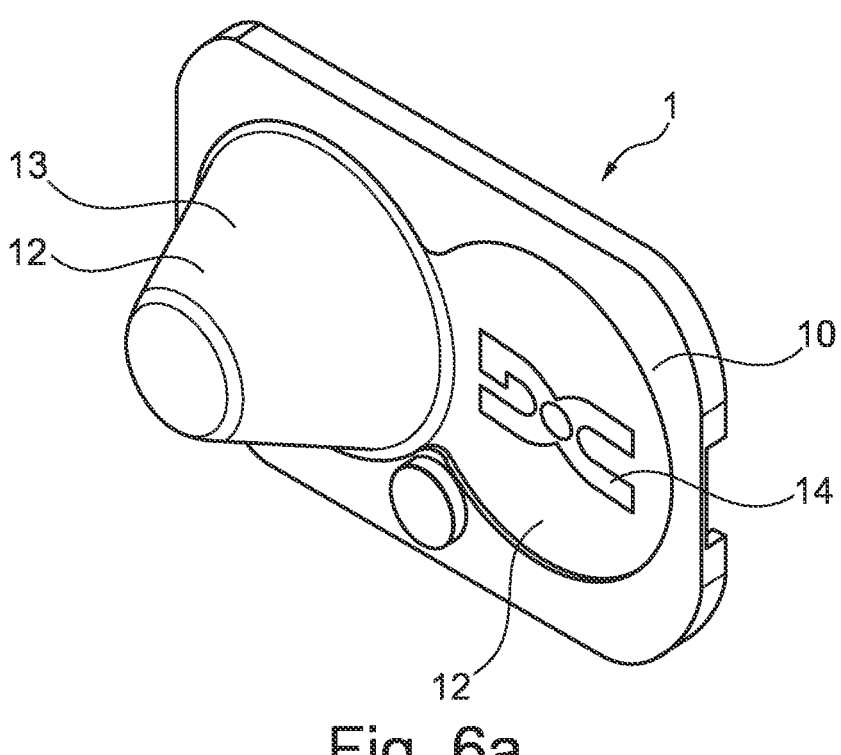
Figure 6B:
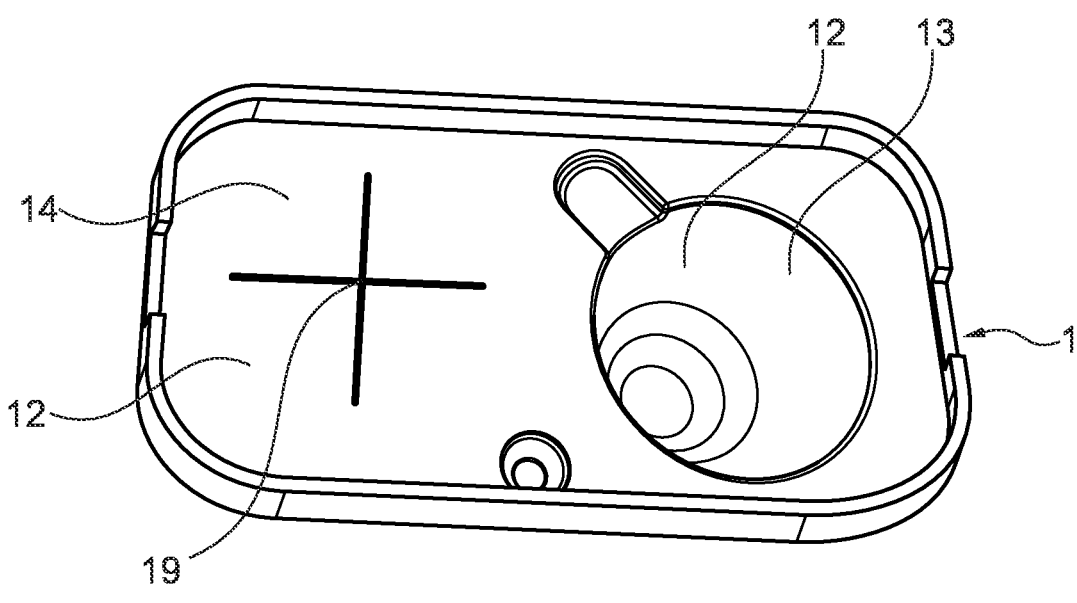

The invention will now be described in more detail with reference to the appended drawings, wherein FIG. 1 discloses a planar view of a front cover according to a first embodiment of the invention, mounted on a coupler for a rail vehicle;

FIG. 2 discloses a perspective view of a first end of a coupler for a rail vehicle;

FIG. 3a discloses a perspective view of a second embodiment of the front cover according to the invention seen from a front side;

FIG. 3b discloses a perspective view of the front cover of FIG. 3a seen from a back side;

FIG. 4a discloses a planar view from the first end of the front cover of the first embodiment mounted on the coupler;

FIG. 4b discloses schematically a planar view from the side of the front cover of FIG. 4a mounted on the coupler before a collision force is applied;

FIG. 4c discloses schematically a planar view from the side of the front cover of FIG. 4a mounted on the coupler during application of a collision force;

FIG. 5a discloses a first stage during a collision of two couplers;

FIG. 5b discloses a second stage during a collision of two couplers;

FIG. 5c discloses a third stage during a collision of two couplers;

FIG. 5d discloses a fourth stage during a collision of two couplers;

FIG. 6a discloses a perspective view of a third embodiment of the front cover of the invention;

FIG. 6b discloses a perspective view of the front cover from the back; and

Figure 7:
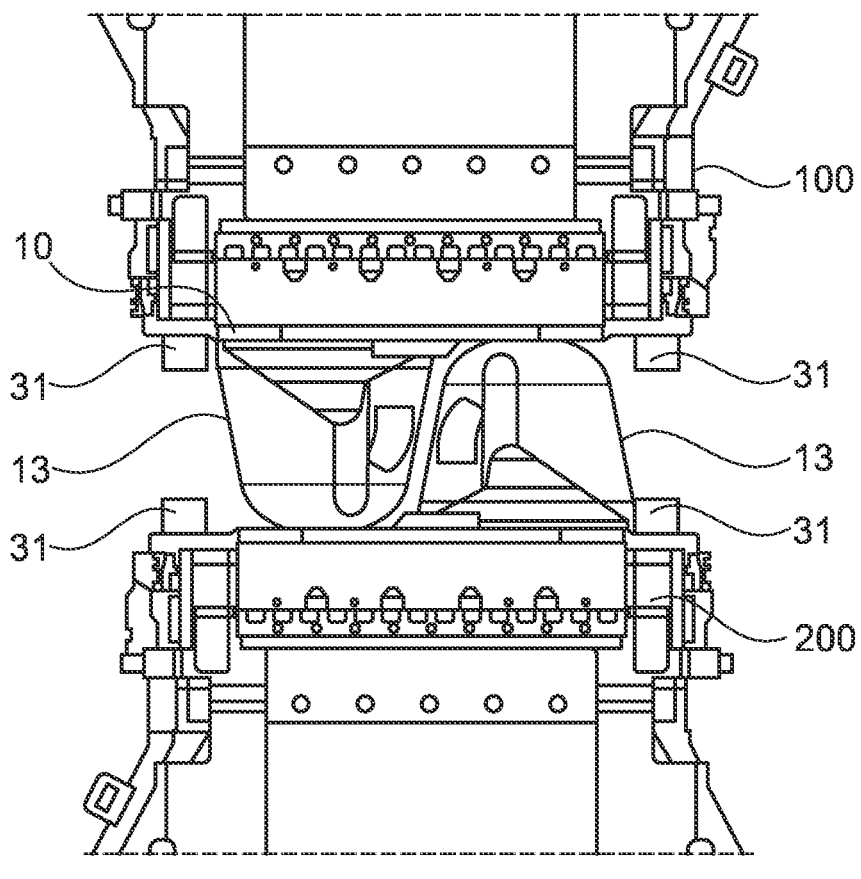

FIG. 7 discloses a planar view of the fourth embodiment of the front cover of the invention.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

FIG. 1 discloses a front cover 1 according to a first embodiment of the present invention. The front cover 1 is mounted on a front end of a coupler 100 that will be descried below with reference to FIG. 2. When in the following terms such as upper, lower, horizontal and vertical are used in connection with the front cover 1, this is to be understood as directions and relations that refer to orientation of the front cover 1 in a mounted state on a coupler such as shown in FIG. 1.

In the following, the term "provide access" is to be understood as allowing one object to approach another without being hindered by another object placed between them. Thus, when access is provided to a coupler this means that a cover portion that is held in front of a coupling connection breaks or deforms so that a protruding coupling connection is able to enter an opening of the coupler. A collision force as defined herein is a force that causes an energy absorption device such as a damper of the coupler to be activated. A first collision threshold is defined as the smallest force that causes reversible energy absorption of a component in the coupler. The first collision threshold is for the present invention 40 kN and this corresponds to a smaller collision such as might occur when a rail vehicle impacts another at low speed, and may also be caused by a hard coupling between two rail vehicles when a speed of one vehicle brought into contact with the other for a coupling procedure is higher than suitable.

Alternatively, the collision force may be defined as a force that causes non-reversible deformation to at least one energy absorption device in a coupler, typically a deformation tube. Non-reversible deformation is in turn defined as a deformation of a component by which the component is unable to elastically resume its original shape after the force has been absorbed. A second collision threshold is defined as the smallest force that causes non-reversible deformation to an energy absorption device, and the second collision threshold is for the present invention 220 kN. This corresponds to a collision such as may typically occur during operation of railway vehicles, i.e. not at low speeds and not where a coupling procedure takes place.

In a coupler, energy absorption devices are generally provided in the form of elastically deformable elements, suitably buffers and dampers, along with energy absorption devices in the form of non-elastically deformable elements such as deformation tubes. A collision force is thus a force that is large enough so that buffers that are typically elastic rubber elements are not able to absorb it. The first collision threshold given above corresponds to a situation where at least one damper is activated, and the second collision threshold corresponds to a situation where the damper or dampers is/are not able to handle the collision force so that irreparable deformation occurs.

The threshold mentioned herein may be compared with a force needed to cause coupling between two similar couplers. This force is generally in the range of 0.1-1 kN but depends on properties and design of the couplers themselves.

When couplers meet at speed, their collision or impact often cause transverse forces that result in pivoting or buckling at their meeting front faces. In order to avoid pivoting, the impact would need to be very small (typically at only 25 kN or below) and also without significant transversal component. In reality, this is very rarely the case so that most impacts at speed would result in buckling of the railway vehicles unless measures were in place to prevent it.

In the following, various embodiments of a front cover will be described and it will be mentioned how the front cover may interact with a front end of a coupler. When thus referring to a coupler this may be understood as the coupler shown in FIG. 2 but it is to be noted that the front cover may also be used with other kinds of couplers that are designed differently. Thus, when it is said that the front cover is mounted on or interacts in some way with "the coupler", this is to be understood as a railway coupler in general and not to be limited to the coupler shown in FIG. 2 and described in more detail herein.

Starting with FIG. 2, some elements of a front end 130 of a coupler 100 is shown. The coupler comprises a mechanical coupler 110 for mechanically coupling to a similar coupler, as is well known in the art. In the coupler 100 shown herein, the mechanical coupler 110 comprises a protruding coupling connection 111 and an opening 112 for allowing access to a receiving coupling connection (not shown). The coupler 100 also comprises draft gear 140 that is fixedly mounted on a railway car as is well known to the skilled person.

This is a general depiction of an automatic coupler that is well known within the art and that functions by a protruding coupling connection of one coupler being inserted into a receiving coupling connection of another similar coupler.

By the coupling connections mating automatically with each other a secure mechanical coupling is achieved. One type of such automatic coupling is shown by the Scharfenberg coupler. Also provided in the coupler 100 of FIG. 2 is an electrical coupler 120 that is configured to mate with an electrical coupler of a similar coupler by the electrical coupler 120 extending and connecting to the other coupler.

Since couplers and their coupling to each other are well known within the art they will not be described in detail herein; suffice it to say that couplers may have different designs and operation as long as they are able to establish a mechanical connection and preferably also an electrical or electronic connection such that mechanical force and preferably also electrical or electronic signals may be transmitted from one coupler to the other. The mechanical coupler may comprise two coupling connections 111 side by side or may alternatively comprise two coupling connections 111 that are arranged differently in relation to each other (one above the other, or one at a distance from the other in any suitable direction). Alternatively, only one coupling connection 111 or more than two coupling connections 111 may be provided. Apart from a mechanical and suitably also electrical coupler, the coupler 100 may also comprise other kinds of connections that may be formed between the coupler 100 and a similar coupler.

The term "mating" as used herein is to be understood as two couplers facing each other with at least one protruding coupling connection of one of them being at least partially inserted into an opening of the other. This means that the mating couplers are held adjacent to each other with their front ends facing each other.

In a coupled position when the coupler 100 is connected to the similar coupler, the mechanical coupler with the at least one coupling connections 111 is engaged and so is the electrical coupler 120. During operation and during standstill, the front end 130 of the coupler 100 is protected from damage by its connections and closeness to the other coupler, so that intrusion of dirt and damage caused by objects hitting the front end 130 is largely prevented.

In an uncoupled state, however, and especially in situations where the railway car on which the coupler 100 is arranged is in operation (i.e. being conveyed along a railway track), damage caused by snow, dirt and small objects such as sand hitting the front end 130 and possibly entering openings provided for the coupling connections 111 and the electrical coupler 120 may cause malfunction and lower the future performance of the coupler 100. For this purpose, the front cover 1 of the present invention is provided.

The front cover 1 comprises a cover body 10 that in this embodiment is in the form of a first cover body section 11 and a second cover body section 15. In the first cover body section 11, at least one deformation zone 12 is provided and in turn comprises a cover portion 16 that extends across the deformation zone 12 so that the front cover 1 is provided without openings through the cover body 10. The cover body 10 itself, i.e. those parts of the cover body 10 that do not belong to the cover portion(s) 16 on the deformation zone(s) 12 are not designed to deform or break. Thus, when the term cover body 10 is used herein, this is to be understood as a rigid body that is not configured to deform or break but instead remain in place during a collision. When in the following embodiments are described in which the cover portion(s) 16 is/are formed by a portion of the cover body 10 being weakened (see e.g. FIG. 6b), that weakened portion is to be understood as a cover portion 16 although it is integrated with the cover body 10.

In the first embodiment, a protruding cover portion 13 is provided on one deformation zone 12 and a non-protruding cover portion 14 is provided on another deformation zone 12, but it is to be noted that the number of deformation zones 12 may vary and that the cover portions 13, 14 may have different shapes depending on design of the coupler 100 on which it is to be mounted. Where a protruding coupling connection 111 is provided, this suitably corresponds to a protruding cover portion 13 in a deformation zone 12 of the front cover 1. On the other hand, where a coupling connection 111 that does not protrude significantly from the front end 130 is provided, this suitably corresponds to a non-protruding cover portion 14. The protruding cover portion 13 is typically conical or frustoconical but may alternatively have another shape.

As also shown in FIG. 1, the deformation zones 12 are provided in the first cover body section whereas the second cover body section 15 does not comprise any deformation zones 12. The purpose of this is to arrange the deformation zones 12 aligned with the coupling connections 111 of the mechanical coupler 110 while at the same time providing the second cover body section 15 without deformation zones to cover the electrical coupler 120.

The deformation zones 12 are designed to be deformable so that coupling connections of a second coupler will be able to access coupling connection 111 of the coupler 110 in the event of a collision between railway vehicles in a situation when the front cover 1 is in place on the front end 130. Although collision with objects present along or on railway tracks may damage the coupling connections, damage caused by two railway vehicles colliding is especially serious since it generally contains a very large collision force. The coupler 100 is generally designed to be able to absorb such forces, but typically rely on the forces to be transmitted through the coupler in a suitable way in order for the energy absorption devices to function as intended. For this reason, pivoting or buckling of the coupler 100 must be avoided.

By thus enabling an establishing of a mechanical coupling or a mating in the event of a collision between two railway vehicles, significant advantages are achieved since collision forces that are applied to the coupler 100 may be distributed in elastically deformable and non-elastically deformable elements of the coupler 100 so that the forces are absorbed and damage to other parts of the coupler 100 and to the railway vehicle to which it is connected may thereby be decreased or even minimized. Collision of the coupler 100 with a similar coupler will be described in more detail further below.

The cover portions 16 suitably comprise a deformable material that is able to be stretched or broken when subjected to a collision force that is at the first collision threshold or larger. Such a deformable material suitably has a shore A hardness of 80 or less, and one suitable material is a polymer material such as polyurethane or silicone rubber. Even more suitably, the deformable material could have a shore A hardness of 30 or less, and one material that is particularly advantageous in this regard is natural rubber. Other materials that are also suitable include EPDM rubber and neoprene. When referring to shore A values herein, this is to be understood as being according to ASTM D2240-00.

In some embodiments, the cover portions 16 could instead comprise a material that is brittle so that a collision force of the first collision threshold or larger causes the cover portion to break away and provide access to the coupling connections 111 of the coupler 100. A brittle material as used herein is defined as a material that breaks into at least two pieces without undergoing significant deformation when subjected to a force. The brittle material would then have an elongation at break of 100% or less, suitably 50% or less and even more suitably 4% or less. For the purpose of this invention, a suitable brittle material for the cover portions 16 would then be a material that breaks into at least two pieces when subjected to a force of the first collision threshold. Such materials include polymers, suitably reinforced polymers such as fiberglass (glass fibre reinforced polymer) or carbon fiber reinforced polymer. One particularly suitable material is epoxy reinforced with a filler such as glass bubbles. When using polymers, the material is advantageously rendered brittle by addition of hard fillers (suitable materials include glass and carbon, but other materials such as talc, kaolin and wollastonite may also be used, or alternatively nanoclay or graphene may also be suitable. Round and cubic filling materials like calcium carbonate, silica or glass beads are especially suitable since they are able to reinforce the material without significantly increasing tensile strength. In some embodiments, the cover portions 16 could alternatively be made form a polymer that is not reinforced.

It is suitable that the brittle cover portions 16 that are configured to break when subjected to a collision force is at the same time able to withstand forces of at least 0.5 kN, more suitably at least 1 kN, in order to be able to avoid breaking in the event of a collision with a small object such as an animal. This protects the coupling connections.

The cover body 11 may comprise only one deformation zone 12 that is covered by a cover portion 16, or alternatively there may be a plurality of deformation zones 12 with cover portions 16. Each cover portion 16 of a front cover 1 according to the invention may comprise the same material, or alternatively different materials may be used for the cover portions 16.

In some embodiments, the cover portions 16 may be fastened onto the cover body 10 in a suitable way, such as by welding or riveting. In other embodiments, the cover portions 16 may be integrated with the cover body 10 and comprise a material that is also present in the cover body 10 as such. In order to achieve the deformable or breakable properties of the cover portions 16, the deformation zones 12 may in such embodiments have a smaller thickness than the rest of the cover body 10. Where a material such as polyurethane is used, the deformation zones 12 may have a thickness that is less than ⅓, preferably less than ⅙ and even more preferably less than ¹⁄₁₀ of a thickness of another part of the cover body 10. A suitable thickness for the deformation zone 12 would in one example be 0.5-2 mm, whereas the rest of the cover body would have a thickness of 3-6 mm for a polymer material. When a steel is used for the rest of the cover body, the steel body could have a smaller thickness such as 2 mm and the deformation zone 12 would then suitably be less than 0.5 mm. When the deformation zone 12 is much thinner than other parts of the cover body 10, the same material may be used both for the cover portion 16 and for the cover body 10, since rendering the material significantly thinner will in most cases also render it more easily deformable so that the cover portion 16 is flexible enough to deform when subjected to the collision force. The cover body 10 suitably comprises a material that has a hardness of at least 70 shore A in order to provide stability to the front cover 1. Suitable materials include polymers, suitably reinforced polymers such as glass fiber reinforced polymer (fiberglass) or carbon fiber reinforced polymer. Metals such as steel are also suitable, as mentioned above.

FIG. 3a discloses a second embodiment of the front cover 1 in an unmounted state, showing the cover body 10 with the at least one deformation zone 12. In the second embodiment, two deformation zones 12 are provided side by side in a horizontal direction so that they are suitable for covering a mechanical coupler such as the one shown in FIG. 2. One of the deformation zones 12 comprises a protruding cover portion 13 and the other comprises a non-protruding cover portion 14. Also provided are at least one holder 21 that serves to mount the front cover 1 on the front end 130 of the coupler 100. The front cover 1 according to the second embodiment comprises only one section of the cover body 10, whereas the first embodiment comprised one section for covering the mechanical coupler and another for covering the electrical coupler, as mentioned above. The at least one holder 21 suitably comprises a metal such as steel.

The protruding cover portion 13 may have any suitable shape for allowing it to be placed on the coupling connection 111 of the coupler 100. In the second embodiment, the protruding cover portion 13 is shown with a frustoconical shape that is selected in order to follow a shape of the coupling connection 111 so that a distance between the protruding cover portion 13 and the coupling connection 111 is small when the front cover 1 is mounted on the coupler 100. Suitably such distance may be less than 1 cm, even more suitably less than 5 mm or even less than 2 mm. It is generally advantageous for the distance to be as small as possible, since this allows for only a small deformation of the protruding cover portion 13 in order for the coupling connection 111 to reach and connect with the coupling connection of the other coupler. Also, since the protruding coupling connection 111 generally differs in width only a few millimeters or even less compared with the opening that provides access into the coupler 100, it is highly advantageous for the cover portions 16 to be able to break or to be deformed and stretched so that they have a thickness of only one millimeter or even less in a deformed or stretched state. This is particularly advantageous since a protruding coupling connection 111, generally in the shape of a cone, is in many couplers 100 adapted to fit into an opening of a similar coupler with the opening having a diameter that exceeds a diameter of the protruding coupling connection 111 by only a few millimeters or even one millimeter. In order for the cover portions to be able to deform and allow the protruding coupling connection 111 to fully enter the opening the cover portion 16 should thus in a deformed and stretched state have a thickness of less than a millimeter so that the intrusion of the coupling connection 111 is not hindered.

When a brittle material is used as cover portions 16, it is to be noted that it may be advantageous to arrange the cover portions 16 at a distance from the coupling connections 111 so that the cover portions 16 are able to shatter and fall away during a collision so that material from the cover portions 16 is entirely removed from the coupling connections 111.

FIG. 3b discloses the second embodiment from a rear side, showing the holders 21 and also showing the protruding cover portion 13 and the non-protruding cover portion 14 from the back. the protruding cover portion 13 and the non-protruding cover portion 14 may be joined separately to the cover body 10 but may alternatively also be joined to each other so that a larger deformation zone 12 is formed and includes both cover portions 16.

Also provided in the second embodiment is at least one handle 22 that serves to facilitate handling and mounting of the front cover 1. Such handle 22 is preferably fastened onto the cover body 10.

The at least one holder 21 is fastened onto the coupler 100 in order for the front cover 1 to reach a mounted state. Suitably, mounting the front cover 1 comprises fitting the deformation zones 12 onto the coupling connections 111 of the mechanical coupler 110 of the coupler, so that access to the coupling connections 111 may be provided by deformation or breaking of the cover portions 16.

Suitably, the at least one holder 21 is configured to break when subjected to the collision force that is of a magnitude of the first collision threshold or higher. By the holders 21 breaking, the transmission of forces from the front cover 1 to the coupler 100 through the holders 21 is avoided, thereby facilitating the distribution of forces through the coupler 100 in order to reach the energy absorption devices as intended. In some embodiments, the at least one holder 21 may instead be configured to undergo an elastic or plastic deformation when a collision occurs so that it bends when subjected to a collision force.

FIG. 4a discloses the front cover 1 according to the first embodiment in the mounted state on a coupler 100. The first cover body section 11 is marked by a rectangle and the second cover body section 15 is marked by another rectangle.

In FIG. 4b, the front cover 1 of FIG. 4a is shown in a planar view from the side, with the first cover body section 11 mounted on the mechanical coupler 110 at a distance from the front end 130 of the coupler 100. The second cover body section 15 is mounted on the electrical coupler 120, and the second cover body section 15 is also offset from the first cover body section 11 in a first direction D. This is a direction that is horizontal when the front cover 1 is in the mounted state, and it is also a direction that is essentially perpendicular to the cover body 10. FIG. 4b also shows the holders 21 that are joined to the cover body 10 and said holders 21 are in the mounted state attached to the coupler 100.

The first cover body section 11 of the cover body 10 is suitably formed as a plate that extends across the front end 130 of the coupler in such a way that it covers the mechanical coupler 110. It is advantageous during a collision that the first cover body section 11 is essentially planar since this aids in guiding an applied collision force in the first direction D.

As shown in FIG. 4b, the offset of the second cover body section 15 gives the cover body 10 a stepped profile. Further, the offset is suitably selected so that the second cover body section 15 is at a distance from the electrical coupler 120 that is larger than the distance from the first cover body section 11 to the mechanical coupler 110.

The first cover body section 11 and the second cover body section 15 are suitably formed as sheets or panels that are configured to be attached to each other and to extend across the front end of the coupler when mounted.

FIG. 4c shows the front cover 1 and the coupler 100 during or immediately after the collision force is applied. In this image, the collision force is shown as a force F in the first direction D. The collision force causes the holders 21 to break free, either by the holders 21 themselves comprising a breakable part that is configured to break when subjected to the collision force, or by an attachment of the holders 21 that joins the holders 21 to the front cover 1 or to the coupler 100 being configured to break.

By the collision force F, the cover body 10 is pushed in the first direction D and the at least one deformation zones 12 deforms or breaks to provide access to the mechanical coupler 110. Also, the cover body 10 is pushed against the mechanical coupler 110, but due to the stepped profile and the offset of the second cover body section 15, the second cover body section 15 does not contact the electrical coupler 120. Thereby, the electrical coupler 120 is protected from the collision force and the mechanical coupler 110 serves to transmit the force into the coupler 100 where it may be decreased through the absorption devices acting to reversibly or non-reversibly absorbing the force.

Mounting of the front cover 1 on the coupler 100 may take place at any suitable time when the rail vehicle is not moving. The mounting comprises providing the front cover 1 and a coupler 100 on which it is to be mounted, and in order to fasten the front cover 1 onto the coupler 100 the at least one deformation zone 12 is aligned with a coupling connection 111 of the coupler 100 and the cover body 10 is fastened in a position where the deformation zone 12 is thus aligned.

Suitably, the at least one holder 21 is provided and the mounting comprises fastening the holders 21 to the coupler 100. In some embodiments, the holders 21 may be provided on the coupler an be fastened to the front cover 1 during mounting, but it is advantageous to provide the holders 21 on or in connection with the front cover 1 so that they may be transported, handled and mounted together without relying on holders 21 being present in connection with the coupler 100. Depending on dimensions of the coupler 100 on which the front cover 1 is to be mounted, a length of the holder 21 may be adjusted so that the cover body 10 may be held at a suitable distance from the mechanical coupler 110.

In embodiments where a second cover body section 15 is provided, mounting suitably comprises aligning the second cover body section 15 with the electrical coupler 120 of the coupler 100.

A collision between a coupler 100 having a front cover 1 mounted thereon and a second coupler 200 will now be described in more detail with reference to FIG. 5a-5d. In the following, it is assumed that the second coupler 200 has the same function and design as the coupler 100 already described, and terms and reference numerals previously used in connection with the coupler 100 will therefore also be used when referring to similar or identical components of the second coupler 200.

As already mentioned, a collision between two rail vehicles is a situation where significant damage may be done to the couplers and also to the rail vehicles and any goods or passengers present inside them. Also, especially in situations where one or more of the rail vehicles is/are derailed, significant damage may also occur to surrounding buildings and other structures in the vicinity. A coupler typically comprises energy absorption devices for absorbing collision forces so that the force transmitted to the rail vehicle is decreased, but in order for such devices to function as intended it is generally required that the collision force is applied to the front end of the coupler without the coupler twisting or pivoting at the front end. Otherwise, the coupler may buckle by the front end of the coupler acting as a pivot, and this prevents operation of the energy absorption devices of the coupler so that the resulting damage to the railway vehicle is significantly increased.

For this purpose among others, couplers are configured to automatically couple mechanically when brought into contact with a similar coupler. Since this provides a stable, non-pivotable connection between the couplers the front end of the coupler is no longer able to act as a pivot and the collision force is therefore transmitted in the horizontal direction through the coupler as intended. When one or both of the couplers have a front cover 1 mounted on its front end 130, it is generally not possible for the automatic coupling to take place since a width of the front cover 1 will cause the couplers to be held with their front ends at a distance from each other. However, the couplers will still be able to reach a position where at least one coupling connection 111 of one of the couplers protrudes into an opening of the other coupler, and this will serve to limit pivoting of the front ends in relation to each other. This position where a coupling connection extends into an opening so that a front end of one coupler is held against a front end of another coupler with at least one front cover held between them, is referred so herein as a mating position and as the front ends mating.

In FIG. 5a, a first stage of a collision between the coupler 100 and a second coupler 200 is shown. The collision force F is also shown. In the first stage, the front cover 1 of the coupler 100 starts to deform by the coupling connection 111 of the second coupler 200 contacting the front cover 1 at the deformation zone 12. In the first stage, the front end 130 acts as a first pivot P1. A second pivot P2 and a third pivot P3 are formed where the coupler 100 and the second coupler 200 each connect to their respective railway vehicle. FIG. 5b discloses a second stage of the collision where the coupling connections 111 of the coupler 100 and the second coupler 200 have connected to each other or the protruding coupling connection has been inserted at least partially into the opening of the other coupler so that the front ends of the couplers 100, 200 are mating. At this stage, the front end 130 of the coupler 100 contacts the front end of the second coupler 200 and the front cover 1 is held between them. The first pivot P1 is now eliminated, rendering the connection between the coupler 100 and the second coupler 200 stable, but the second pivot P2 and the third pivot P3 are still able to pivot.

In FIG. 5c-5d, the second coupler 200 is shown with its energy absorption devices exposed in order to further elucidate the energy absorption. In a third stage, a damper 160, 260 of each of the couplers 100, 200 absorbs energy as commonly known in the art. In a fourth stage shown in FIG. 5d deformation units 170, 270 are non-elastically deformed, causing irreversible deformation. Once all four stages have taken place, whatever collision force is left after energy absorption by the couplers 100, 200 is finished is transferred to the railway vehicles that in turn generally comprise devices for absorbing energy.

The collision described above with reference to FIG. 5a-5d shows a collision where the collision force is above the second collision threshold so that the deformation tubes 170, 270 are activated. In collision where the force is smaller, or in situations where two couplers are coupled but the front cover 1 is accidentally not removed, the collision or coupling would instead comprise only the first, second and third stages. The collision force is in this event at or above the first collision threshold but below the second collision threshold. As a result of such a smaller collision or a hard coupling where a speed of one of the couplers is higher than intended, no absorption devices in the coupler is irreversibly damaged and operation of the coupler may continue without requiring maintenance. For a collision involving a collision force above the second threshold, however, repair or even replacing of the coupler is needed.

FIG. 6a discloses a third embodiment of the front cover 1, having a cover body 10 that surrounds the deformation zones 12 but that in the mounted state does not extend to cover the front end of the coupler. This front cover 1 comprises one protruding cover portion 13 and one non-protruding cover portion 14 but it may alternatively comprise just one cover portion 16 or more than two, depending on the coupler where it is to be mounted.

FIG. 6b discloses an embodiment where the cover portions 16 are integrated with the cover body 10 and where a protruding cover portion 16 is used to cover one of the deformation zones 12. The protruding cover portion 13 may be rendered deformable or breakable by material in the protruding cover portion 16 being thinner than material in the cover body 10 surrounding the deformation zones 12, or alternatively the protruding shape as such may be sufficient to cause breakage when a collision takes place. The other deformation zone 12 shown in FIG. 6b is covered by a non-protruding cover portion 14 that is also integrated with the cover body 10. The material of the non-protruding cover portion 14 is rendered deformable or breakable by creating at least one groove 19 to weaken the material. Suitably, as shown in FIG. 6b two grooves are made to intersect each other in order to cause a weakening at the intersection in particular. Grooves may be made by milling or cutting, or by any other suitable method. In some embodiments, a protruding cover portion 13 may also comprise at least one groove, or alternatively any cover portion 16 in the front cover 1 may comprise at least one groove.

FIG. 7 discloses a fourth embodiment of the front cover 1, that differs from the embodiments described above by comprising at least one but suitably a plurality of protrusions 31 that extend from the cover body 10 and that are configured to match protrusions 31 on a similar front cover 1 that is mounted on another coupler. The protrusions 31 suitably comprise a material that is harder than the cover body 10 so that the protrusions deform less than the cover body 10 during a collision. By the protrusions 31 being placed to match protrusions 31 on an opposing front cover 1, they will contact each other during the collision and hold the front covers 1 at a distance and aligned with each other. It is advantageous that the protrusions 31 extend a smaller distance from the cover body 10 than the protruding cover body 13, in order to ensure that the mating of the couplers 100, 200 may take place. In one embodiment, the protrusions 31 may suitably be placed on either side of the deformation zones 12 in a horizontal direction. In another embodiment, the protrusions 31 may instead be provided at four corners of the cover body 10, and in yet another embodiment the protrusions 31 may be provided in a rectangle or circle around the deformation zones 12.

One particular advantage of the protrusions 31 is that they serve to hold the front covers 1 of two colliding couplers 100, 200 at a distance from each other while still preventing them from pivoting during the collision so that buckling is avoided. This is beneficial since the cover portions 16 may have an increased thickness in embodiments where they are configured to deform by being stretched as the coupling connection 111 of one coupler 100 enters an opening of the other coupler 200. Due to the protrusions 31 holding the couplers apart, the coupling connection 111 that is generally conically or frustoconically shaped will not be able to protrude so far into the opening that the thickness of the cover portions 16 would hinder the mating of the front ends.

It is to be noted that features from the various embodiments described herein may freely be combined, unless it is explicitly stated that such a combination would be unsuitable.

The invention claimed is:

1. Front cover for a coupler for a rail vehicle, the front cover comprising a cover body (10) for covering a front end of the coupler, wherein
the cover body (10) comprises at least one deformation zone (12), and
said deformation zone (12) having at least one cover portion (16) that is configured to break or deform when subjected to a collision force for providing access through the cover body (10) at the at least one deformation zone (12) during a collision.

2. Front cover according to claim 1, wherein the cover body (10) comprises
a first cover body section (11) for covering a mechanical coupler on the front end of the coupler, and
a second cover body section (15) for covering an electrical coupler on the front end of the coupler, said second cover body section (15) being attached to the first cover body section (11), and
wherein the first cover body section (11) comprises the at least one deformation zone (12).

3. Front cover according to claim 2, wherein the second cover body section (15) is offset from the first cover body section (11) in a first direction (D), said first direction (D) being a direction horizontal when the front cover (1) is mounted on a coupler.

4. Front cover according to claim 3, further comprising at least one holder (21) for mounting the front cover (1) on a coupler.

5. Front cover according to claim 1, further comprising at least one holder (21) for mounting the front cover (1) on a coupler.

6. Front cover according to claim 5, wherein said at least one holder (21) comprises a breakable part that is configured to break when subjected to the collision force.

7. Front cover according to claim 1, wherein said collision force is a force of at least 40 kN.

8. Front cover according to claim 1, wherein said collision force is a force of at least 220 kN.

9. Front cover according to claim 1, wherein the at least one cover portion (16) comprises an elastomer.

10. Front cover according to claim 1, wherein the at least one cover portion is made from brittle material.

11. Front cover according to claim 1, wherein the at least one cover portion comprises metal or reinforced polymer.

12. Front cover according to claim 1, wherein at least one cover portion (16) protrudes from the cover body (10) to form a protruding portion (13) for covering a coupler connection of a coupler in a mounted state on a front end of a coupler.

13. Front cover according to claim 1, wherein the cover portion (16) of the at least one deformation zone (12) is mounted on the cover body (10).

14. Front cover according to claim 1, wherein the cover portion (16) of the at least one deformation zone (12) is integrated with the cover body (10).

15. Front cover according to claim 14, wherein the cover portion (16) is configured to deform or break by the cover portion (16) comprising at least one groove.

16. Coupler for a rail vehicle, the coupler comprising a mechanical coupler (110) having at least one coupling connection (111) for forming a mechanical coupling with a similar coupler, the coupler further comprising a front cover (1) according to claim 1, wherein the front cover (1) is mounted on a front end (130) of the coupler such that a cover portion (16) of a deformation zone (12) of the front cover (1) covers a coupling connection (111).

17. Method for mounting a front cover on a coupler of a rail vehicle, the method comprising providing a front cover (1) according to claim 1, providing a coupler (100) for a rail vehicle, the coupler comprising at least one coupling connection (111) for mechanically coupling the coupler (100) to a similar coupler, wherein the coupling connection (111) is arranged at a front end (130) of the coupler (100), and applying the front cover (1) to the front end (130) of the coupler (100) such that a deformation zone (12) of the cover body (10) of the front cover (1) covers the coupling connection (111) of the coupler (100).

18. Method according to claim 17, further comprising mounting a holder (21) of the front cover (1) on the coupler (100) for fixating the front cover (1) in relation to the coupler (100).

19. Method according to claim 17, further comprising placing the front cover (1) on the front end (130) of the coupler (100) such that a first cover body section (11) covers the mechanical coupler (110) with the coupling connection (111) and a second cover body section (15) covers an electrical coupler (120) of the coupler (100).

20. Method for deforming a front cover according to claim 1, comprising bringing a front cover (1) mounted on a front end (130) of a first coupler (100) into contact with a front end of a second coupler (200) such that a collision force is applied in a first direction (D), and deforming or breaking a cover portion (16) of at least one deformation zone (12) on the front cover (1) such that a coupling connection (111) arranged in the front end of the second coupler (200) penetrates the front cover (1) and protrudes into the front end (130) of the first coupler (100).

\* \* \* \* \*